Aug. 25, 1959　　　K. FIRMENICH　　　2,901,664
CIRCUIT-ARRANGEMENT FOR PRODUCING ADJUSTABLE REFERENCE
LINES ON THE PICTURE SCREENS OF CATHODE-RAY TUBES
SIMULTANEOUSLY WITH THE CURVE OF A PHENOMENON
Filed March 13, 1956

INVENTOR
KLAUS FIRMENICH
BY
AGENT

United States Patent Office 2,901,664
Patented Aug. 25, 1959

2,901,664

CIRCUIT-ARRANGEMENT FOR PRODUCING ADJUSTABLE REFERENCE LINES ON THE PICTURE SCREENS OF CATHODE-RAY TUBES SIMULTANEOUSLY WITH THE CURVE OF A PHENOMENON

Klaus Firmenich, Wetzlar, Germany, assignor, by mesne assignments, to North American Philips Company, Inc., New York, N.Y., a corporation of Delaware Application March 13, 1956, Serial No. 571,305

Claims priority, application Germany May 5, 1955

9 Claims. (Cl. 315—22)

In reproducing measuring curves, more particularly frequency-response curves according to the frequency-wobbling method, for example bandpass filter curves and the like, on the picture screen of a cathode-ray tube, it is necessary to test such measuring curves, more particularly for quantitative measurements. The following measurements are of special importance:

(1) Measurement of the bandwidth of resonance curves at a voltage of $1/\sqrt{2x}$ the circuit voltage applied. This permits of determining the quality of a tuned resonance circuit.

(2) Measurement of the voltage ratio between the highest points of a bandpass filter curve and the lowest point of the device for determining the K.Q.-value of a double-tuned bandpass filter ($K$=coupling factor, $Q$= quality of the circuit).

(3) Measurement of the bandpass width of a double-tuned bandpass filter at a voltage of $1/\sqrt{10x}$ the circuit voltage applied, in order to judge of the selectivity.

To be able to utilize or measure a curve reproduced on the picture screen of a cathode-ray tube, it is known to arrange a measuring raster or a templet either on or in front of the picture screen. Determined frequency values may also be indicated on the measuring curve by means of light or dark marks. It is also known to project on the picture screen by oscillographic means an adjustable reference voltage as an electric measure or reference line simultaneously with the measuring curve. In known devices, said reference voltage is produced by a separate generator and, if desired, amplified in the amplifier for the measured voltage. More particularly in series-measurements it is possible for the permissible tolerances of determined measured values of a measuring curve as indicated, for example, by means of frequency marks, to be laid down in a simple manner with the use of reference lines reproduced on the picture screen.

However, if the reference voltage and the measured voltage are each derived from a separate generator, the risk is involved that, if the generators are changed, the ratio between the measured voltage and the reference voltage does not remain constant, so that it must continuously be tested, whether there is conformity with a calibration value and whether readjustment is necessary. This is complicated and time-consuming in series-measurements.

In a circuit-arrangement of the kind as mentioned in the preamble, said disadvantages are obviated by choosing the amplitude of the reference voltages producing the reference lines to be proportional with the peak value of the measured voltage of the process measured. The reference voltages are preferably derived directly from the measured voltage of the process measured.

This arrangement ensures that the reference voltages automatically follow any variation in the measured voltage, so that the ratio between the reference voltage and the measured voltage always remains constant. Since in the above-mentioned measurements the essential point always is the ratio between a reference voltage and the peak value of the measured voltage, a constant measure is thus ensured (since the reference voltage is related to the same peak value), which need not be recalibrated and tested.

The circuit-arrangement according to the invention preferably comprises means for converting a fraction of the measured voltage, which is preferably amplified, into a direct voltage, so that the reference voltage appears as a horizontal line on the picture screen.

In order to be able to reproduce simultaneously a plurality of reference lines, a potentiometer is provided, which permits of converting a reference voltage into a plurality of individual reference voltages of adjustable value. For discontinuously applying the measured voltage and the individual reference voltages to the cathode-ray tube, provision is preferably made of electronic switches, controlled by multivibrators, the sawtooth generator which produces the horizontal deflection voltage of the cathode-ray tube advantageously comprising one or more pulse stages for controlling the multivibrators of the electronic switches.

The cathode-ray tube used for the device according to the invention may be either a tube with one ray, to which the reference voltages and the measured voltage are applied via electronic switches, or a tube with a plurality of rays, preferably two rays, the measured voltage and the reference voltages each being applied to one deflection system.

In order that the invention may be readily carried into effect, two embodiments will now be described, by way of example, with reference to the accompanying diagrammatic block diagrams.

Figure 1:
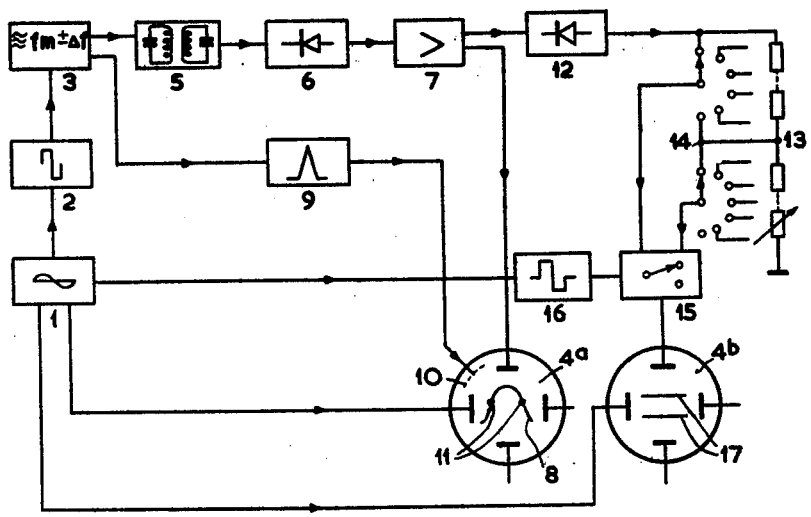
Fig. 1 shows a circuit-arrangement according to the invention in combination with a wobbling device and a cathode ray tube with two rays.
Figure 2:
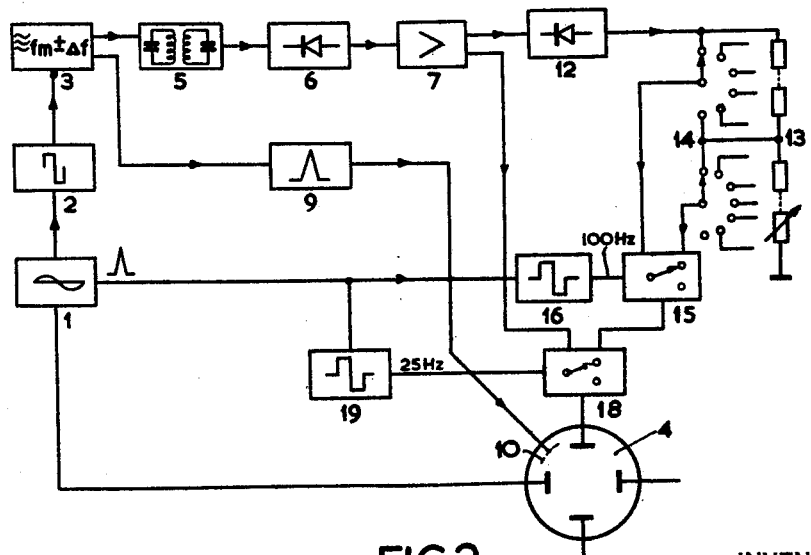
Fig. 2 shows the circuit-arrangement of Fig. 1, but comprising a cathode-ray tube with one ray.

A sawtooth generator 1 comprising one or more pulse stages controls, via a multivibrator 2, a wobbling generator 3 and also the horizontal deflection systems of a cathode-ray tube 4. The cathode-ray tube 4 shown in Fig. 1 is of the type having two rays, comprising two systems 4a and 4b, whereas that of Fig. 2 is of the type with one ray. The generator 3 is cut-off during the flyback time of the electron ray by means known per se. The generator 3 acts upon the object 5 to be tested, for example a bandpass filter, of which the measured voltage is applied via a rectifier 6 to an amplifier 7 and thence to the vertical plates of the system $a$ of the picture tube 4 shown in Fig. 1. The measured voltage of generator 3 produces a response curve 8 of bandpass filter 5 on the picture screen of tube 4.

The generator 3 also controls a pulse source 9 by way of invariably tuned oscillatory circuits or the like, which have the output voltage of generator 3 applied to them and which start to oscillate when the wobbling frequency becomes equal to the irresonance frequencies, said pulse source producing frequency marks on the response curve 8 via a Wehnelt cylinder 10 of picture tube 4.

According to the invention, in order to mark a range of tolerances for the positions of the frequency marks 11 by means of reference lines, a fraction of the measured voltage is applied to the vertical plates of system $b$ of the picture tube. A fraction of the output voltage of amplifier 7 is applied via a rectifier 12 to a potentiometer 13, by which the reference voltage derived from the measured voltage is converted into a plurality of individual reference voltages of adjustable value. The values of the individual reference voltages may be chosen at will by means of a rotary switch 14 and are adjusted in accordance with the tolerance limits. By means of an electronic commutator 15, controlled by the sawtooth generator 1 via a multivibrator 16, the two individual reference voltages of potentiometer 13 are alternately applied in rapid sequence to the vertical plates of the system $b$. The two reference voltages thus produce two perpendicular lines 17 on the picture screen of tube 4, which lines are superposed on the oscillogram produced by system $a$ on the common picture screen for the two systems and thus indicate the tolerance limits for the postiions of the frequency marks 11. Consequently, the tolerance limits in this device are in constant relationship with the peak voltage of the response curve 8 reproduced, so that continuous testing and recalibration of the measuring device is not necessary.

Instead of utilizing a picture tube with two rays, use may be made of a picture tube with one ray. The corresponding circuit-arrangement thereof is shown in Fig. 2. The required additional electronic commutator 18, which is connected before the vertical system of picture tube 4 and which causes the measured voltage and the reference voltages ot be applied alternately to the vertical system, is controlled by the sawtooth generator 1 via an additional multivibrator 19. The switching frequencies are the following: 100 c./s. for the commutator 15 and 25 c./s. for the additional commutator 18; both frequencies may be derived from the deflection frequency of 50 c./s.

What is claimed is:

1. An electrical measuring system comprising a display device having a screen means for producing an electrical signal curve to be measured, said signal curve having a peak value, means connected to display said curve on said screen, means for generating one or more reference voltage signals which are proportional to a fraction of the peak value of said curve, and means connected to display said reference voltage signals on said screen.

2. A system as claimed in claim 1, in which said means for generating reference voltage signals comprises a resistance network connected to receive said signal curve.

3. A system as claimed in claim 1, including an electronic switch connected to alternately apply two or more of said reference voltage signals to said display device.

4. A system as claimed in claim 1, in which said display device has two or more display means for displaying two or more images simultaneously on said screen, means connected to apply said signal curve to one of said display means, and means connected to apply said reference voltage signals to one or more of the remaining said display means.

5. A system as claimed in claim 1, including an electronic switch connected to alternately apply said signal curve and said voltage signals to said display device.

6. An electrical measuring system comprising an oscillographic display device having sweep electrodes and display signal electrodes, a component having a frequency-response characteristic to be measured, a source of swept-frequency signal, means to feed said swept-frequency signal to said sweep electrodes, means to feed said swept-frequency signal through said component to display signal electrodes of said device, means for generating one or more reference voltage signals which are proportional to a fraction of the peak value of the swept-frequency signal after being fed through said component, and means for feeding said reference voltage signals to display signal electrodes of said device.

7. A system as claimed in claim 6, in which the swept-frequency signal from said component and said reference voltage signals are fed to different display signal electrodes of said device.

8. A system as claimed in claim 7, in which two or more of said reference voltage signals are generated, and including an electronic switch connected to alternately feed said reference voltage signals to a set of said display signal electrodes, and synchronizing means connected to synchronize said electronic switch with said swept-frequency signal.

9. A system as claimed in claim 6, including an electronic switch connected to alternately feed the swept-frequency signal from said component and said reference voltage signals to the same display signal electrodes, and synchronizing means connected to synchronize said electronic switch with said swept-frequency signal.

References Cited in the file of this patent

UNITED STATES PATENTS

| | | |
|---|---|---|
| 2,466,590 | Jacobs | Apr. 5, 1949 |
| 2,563,395 | Carpenter | Aug. 7, 1951 |
| 2,602,839 | Ellis | July 8, 1952 |
| 2,639,379 | Blancher | May 19, 1953 |
| 2,678,406 | Beale | May 11, 1954 |
| 2,731,583 | Ellis | Jan. 17, 1956 |